United States Patent [19]
Lippke, deceased

[11] 3,823,371
[45] July 9, 1974

[54] DEVICE FOR MEASURING PHYSICAL PROPERTIES OF A MOVING WEB

[76] Inventor: Paul Lippke, deceased, late of Walter Rathenau-Strasse 14, Neuwied, Germany, by Rudolf Hiemke, executor

[22] Filed: May 30, 1972

[21] Appl. No.: 267,952

[30] Foreign Application Priority Data
July 1, 1971 Germany............................ 2132712

[52] U.S. Cl.................... 162/263, 73/73, 324/61 R
[51] Int. Cl............................................ G01r 27/26
[58] Field of Search ....... 324/61 R; 162/263; 73/73, 73/74

[56] References Cited
UNITED STATES PATENTS

| | | | |
|---|---|---|---|
| 2,512,372 | 6/1950 | Pakala............................ | 324/61 R X |
| 3,376,503 | 4/1968 | Lundstrom....................... | 324/61 R |
| 3,493,854 | 2/1970 | Zurbrick........................... | 324/61 R |

*Primary Examiner*—Stanley T. Krawczewicz
*Attorney, Agent, or Firm*—Walter Becker

[57] ABSTRACT

A device for measuring physical properties of a moving web which passes over successive peripheral sections of a hollow rotatable drum which within the range of value indicator means within the drum is adapted to engage the web the properties of which are to be measured.

5 Claims, 4 Drawing Figures

DEVICE FOR MEASURING PHYSICAL PROPERTIES OF A MOVING WEB

The present invention relates to an apparatus for measuring physical properties of moving webs of paper or the like by means of one or more measured value indicators spaced from the web at a predetermined distance. The present invention is particularly intended for measuring the moisture content of such moving webs.

Heretofore known devices of this general type are not suitable for measuring so-called enameled or coated papers because the surface of such papers is highly sensitive and may be damaged by the friction which occurs between the measured value indicators and the web when the latter is in motion. Similar problems may also be encountered with delicate foils of synthetic materials. Furthermore, heretofore known devices of the type involved are not suitable for use in the so-called wet section of a paper making machine.

It is, therefore, an object of the present invention to provide an apparatus of the above described general character which can be used in connection with moving webs having a sensitive surface or a reduced mechanical strength while at the same time the web is precisely guided within the range of the measuring area for purposes of obtaining a precise measured value.

This object and other objects and advantages of the invention will appear more clearly from the following specification in connection with the accompanying drawings, in which.

Figure 1:
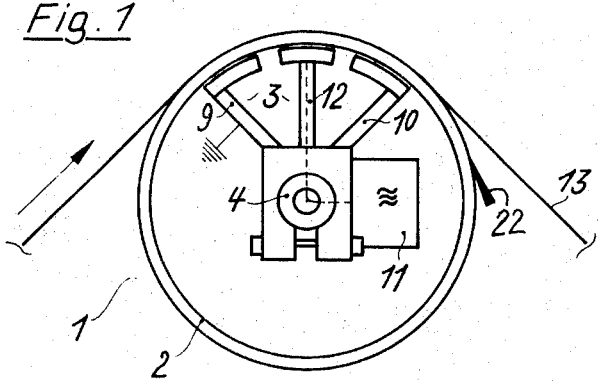
FIG. 1 is an end view of an apparatus according to the present invention.
Figure 2:
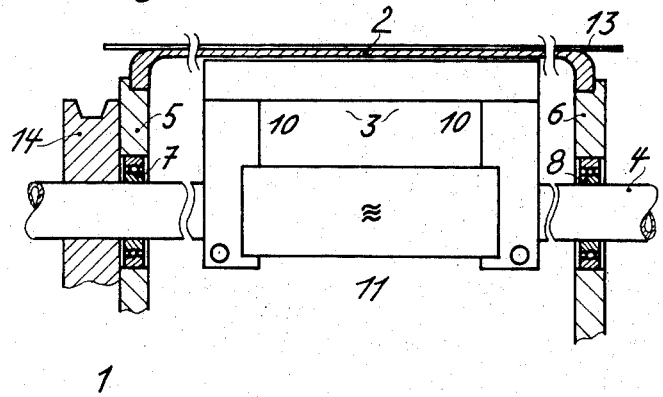
FIG. 2 shows the apparatus of FIG. 1, partly in side view and partly in section.

The apparatus according to the present invention is characterized primarily in that the measured value indicator or indicators is or are arrranged within a hollow cylinder which is rotatable about its axis and which is adapted within the range of the measured value indicator to be brought into contact with the web with the axis of the cylinder extending parallel to the direction of movement of the web and located in a plane parallel to the web. In this way it will be assured that the moved web, on one hand, will always be spaced by a predetermined distance from the measured value indicators and that, on the other hand, practically no damage can be done to the web or to its surface.

According to a further development of the invention it is advantageous to drivingly connect the hollow cylinder with a separate controllable driving device for purposes of equalizing the pulling stresses existing in the web in the direction of movement of the web ahead of and behind the hollow cylinder. In this way it is possible to eliminate even the rather slight effect of the frictional forces which occur in the bearings for the hollow cylinder.

It is possible to arrange the electrical evaluating devices outside the hollow cylinder and to establish the electrical connection with the measured value indicators, for instance, through conductors which in the hollow shaft of the hollow cylinder lead up to the measured value indicators.

According to an expedient design of the apparatus according to the invention it is provided that in the hollow cylinder, in addition to the measured value indicators, there are also arranged the electrical evaluating devices which are operatively connected to the measured value indicators.

Referring now to the drawings in detail, the apparatus according to the invention is generally designated with the reference numeral 1 and comprises primarily a hollow cylinder 2 having arranged in the interior thereof measured value indicators 3. The indicators 3 are connected to a stationary shaft 4. The hollow cylinder 2 is closed at both ends by flanges 5 and 6. Inserted into the flanges 5 and 6 are ball bearings 7 and 8 respectively which are connected to the shaft 4.

As measured value indicators, the drawings show so-called stray field condensors which may be employed dielectrically for measuring the moisture content of a moving web. In this connection, for instance, one pole of a high frequency generator may be connected with the arms 9 and 10 of a measured value indicator 3, whereas the arm 12 is connected with the other pole of this generator. It is, however, also possible to provide measured value indicators within the hollow cylinder 2 which operate according to another physical principle. For instance, measured value indicators may be employed which react to nuclear radiation, for measuring, for instance, the thickness or the surface weight of a web. Furthermore, it is possible that with a corresponding selection of the material of the hollow cylinder 2, also measured value indicators may be employed which react to light or infrared radiation. For a precise measuring it is merely necessary that the web 13 is sufficiently widely looped around the hollow cylinder 2 within the region of the measured value indicator 3 so that no faulty measurements can occur due to a possibly changing distance between the web and the measured value indicator.

Figure 3:
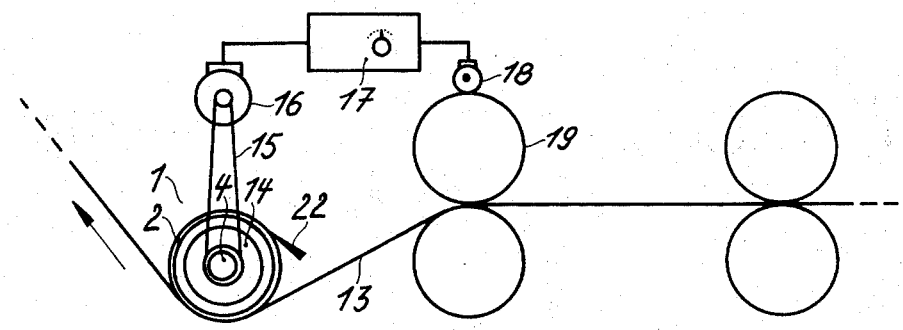
FIG. 3 illustrates a possibility of controlling the drive of the hollow cylinder of the apparatus according to the invention.

Fixedly connected to the flange 5 is a driving wheel 14 (FIG. 3) which, for instance, through a V-belt 15 is drivingly connected to a motor 16 having its speed controlled by a control device 17. To the inlet (not indicated in detail) of the control device 17 there is connected the outlet of a tachogenerator 18. The tachogenerator 18 is driven in conformity with the speed of the roll or drum 19 which may, for instance, be the drum of a paper making machine. In conformity with the output signal of the tachogenerator 18 the control device 17 controls the motor 16 in such a way that the hollow cylinder 2 of the device 1 is driven at such a speed that the pulling stresses in the web 13 ahead of and behind the device 1 are equal as far as possible so that the still existing friction in the bearings of the hollow cylinder 2 will not be able to exert a disadvantageous influence on the web 13 and its surface.

Figure 4:
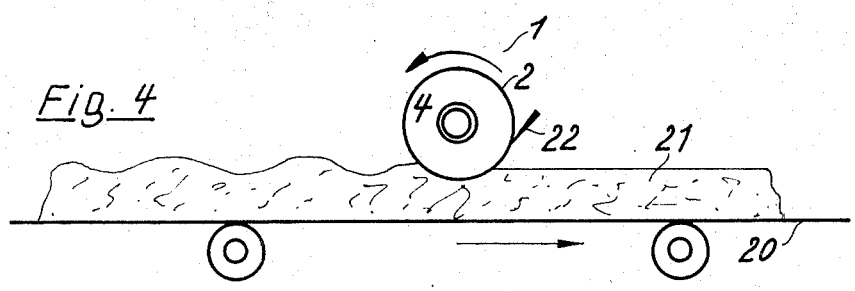
FIG. 4 illustrates another possibility of advantageously employing the apparatus according to the invention.

FIG. 4 shows a further possibility of employment of the apparatus according to the invention. In this instance there is shown a conveyor belt 20 for transporting, for instance, molding sand 21 which is to be moistened as it is required in foundries. By means of the device 1 it is possible relatively precisely to ascertain the moisture content of the molding sand to be moistened and subsequently to determine the quantity of liquid to be added in order to obtain a molding sand property with optimum values for casting. For a precise measurement it is very advantageous in this connection to provide a doctor blade or scraper 22 which will free the outer mantle surface of the hollow cylinder 2 from particles of the molding sand which might stick thereto. Such scrapers may also advantageously be used in connection with the employment of the apparatus 1, for instance, on a paper making machine in order always to keep the mantle surface of the hollow cylinder in clean condition.

It is, of course, to be understood that the present invention is, by no means, limited to the particular showing in the drawings, but also comprises any modifications within the scope of the appended claims.

What is claimed is:

1. A device for measuring physical properties of materials, e.g., the moisture content, of a movable web, especially a paper web, which includes: a hollow rotatable drum having its axis of rotation extend in a direction transverse to the direction of movement of the web for which the physical properties are to be measured, bearing means rotatably supporting said drum, and fixed value indicator means arranged within said drum and located around the axis of rotation of said drum while being spaced by a predetermined distance from the web for which the physical properties are to be measured, said drum being adapted within the region of said value indicator means to contact the web for which the physical properties are to be measured in a plane located substantially parallel to the axis of rotation and extending transverse to direction of movement of the web.

2. A device according to claim 1, which includes driving means drivingly connected to said drum, and control means operatively connected to said driving means for equalizing the pull stresses in the web ahead of and behind the drum section contacting the web for which the physical properties are to be measured.

3. A device according to claim 1, in which said value indicator means include electric evaluating means also arranged within said drum.

4. A device according to claim 1, which includes doctor blade means arranged to remove deposits adjacent the periphery of said drum past the drum surface where the material for which the properties are to be measured leaves said drum.

5. A device according to claim 4, which includes a conveyor belt passing over successive peripheral surface sections of said drum and adapted to convey material for which the moisture content is to be ascertained.

* * * * *